United States Patent
Tecson et al.

(10) Patent No.: US 11,261,999 B2
(45) Date of Patent: Mar. 1, 2022

(54) APPARATUS AND METHOD FOR RETAINING A NOISE ATTENUATION ASSEMBLY FOR USE WITH A PRESSURE REGULATOR

(71) Applicant: EMERSON PROCESS MANAGEMENT REGULATOR TECHNOLOGIES, INC., McKinney, TX (US)

(72) Inventors: Joshua Logan Tecson, Bedford, TX (US); Roy R. Pelfrey, Sherman, TX (US)

(73) Assignee: EMERSON PROCESS MANAGEMENT REGULATOR TECHNOLOGIES, INC., McKinney, TX (US)

(*) Notice: Subject to any disclaimer, the term of this patent is extended or adjusted under 35 U.S.C. 154(b) by 0 days.

(21) Appl. No.: 16/668,468

(22) Filed: Oct. 30, 2019

(65) Prior Publication Data
US 2020/0063893 A1    Feb. 27, 2020

Related U.S. Application Data (63) Continuation of application No. 15/254,805, filed on Sep. 1, 2016, now abandoned.

(51) Int. Cl.
F16K 47/08 (2006.01)
F16K 1/12 (2006.01)
(Continued)

(52) U.S. Cl.
CPC ........... F16K 47/08 (2013.01); F16K 1/123 (2013.01); F16K 31/1262 (2013.01); F16L 55/02718 (2013.01); G05D 16/0655 (2013.01)

(58) Field of Classification Search
CPC ...... F16K 47/08; F16K 1/123; F16K 31/1262; F16L 55/02718; G05D 16/0655
See application file for complete search history.

(56) References Cited

U.S. PATENT DOCUMENTS

| | | | | |
|---|---|---|---|---|
| 825,010 A ‡ | 7/1906 | Snow | ................ | F01N 1/08 181/264 |
| 3,003,516 A ‡ | 10/1961 | Granberg | ............ | G01F 15/005 137/220 |

(Continued)

FOREIGN PATENT DOCUMENTS

| CN | 204962011 U | 1/2016 |
|---|---|---|
| CN | 106979378 A | 7/2017 |

(Continued)

OTHER PUBLICATIONS

International Search Report and Written Opinion, corresponding to International Application No. PCT/US2017/048526, dated Oct. 30, 2017.‡

(Continued)

*Primary Examiner* — Angelisa L. Hicks
(74) *Attorney, Agent, or Firm* — Marshall, Gerstein & Borun LLP (57) ABSTRACT

A fluid regulating device includes a valve having an inlet and an outlet and an actuator coupled to the valve and having a control assembly. The control assembly includes a control element and a diaphragm operably connected to the control element, the control element disposed within the valve and adapted to be displaced relative to a valve seat. A noise attenuation assembly is coupled to the outlet of the valve and includes a cylindrical body and at least one plate disposed in the cylindrical body, the at least one plate having an outer edge. An apparatus for retaining the noise attenuation assembly includes a plurality of rods coupled to the at least one plate. The plurality of rods includes at least one rod (Continued)

having a first end disposed through the outer edge of the at least one plate to support the noise attenuation assembly.

17 Claims, 7 Drawing Sheets

(51) Int. Cl.
  *F16K 31/126* (2006.01)
  *F16L 55/027* (2006.01)
  *G05D 16/06* (2006.01)

(56) References Cited

U.S. PATENT DOCUMENTS

| | | | | | |
|---|---|---|---|---|---|
| 3,690,344 | A | * | 9/1972 | Brumm | F16K 47/08 137/625.28 |
| 4,103,702 | A | * | 8/1978 | Duthion | F16K 3/26 137/375 |
| 4,162,784 | A | ‡ | 7/1979 | Legille | C21B 7/005 251/127 |
| 4,751,980 | A | ‡ | 6/1988 | DeVane | F01N 1/04 181/224 |
| 5,610,360 | A | * | 3/1997 | Kazyaka | F41A 21/30 181/223 |
| 7,011,180 | B2 | ‡ | 3/2006 | Gallagher | F16L 55/0331 181/232 |
| 7,100,737 | B2 | * | 9/2006 | Sishtla | F04C 29/063 181/222 |
| 8,740,450 | B2 | * | 6/2014 | Mogami | B01F 5/0604 366/340 |
| 2012/0006615 | A1 | ‡ | 1/2012 | Klasing | F02K 3/075 181/22 |
| 2013/0153808 | A1 | * | 6/2013 | Folk | F16K 25/005 251/359 |
| 2014/0069737 | A1 | ‡ | 3/2014 | May | F01N 1/00 181/20 |
| 2015/0300525 | A1 | ‡ | 10/2015 | Lin | F16L 55/02718 181/247 |

FOREIGN PATENT DOCUMENTS

| | | | |
|---|---|---|---|
| CN | 106979432 A | | 7/2017 |
| CN | 207049502 U | | 2/2018 |
| CN | 207554952 U | | 6/2018 |
| DE | 1 261712 B | ‡ | 2/1968 |
| DE | 1261712 B | | 2/1968 |

OTHER PUBLICATIONS

China National Intellectual Property Administration (CNIPA) Notification of the First Office Action for Chinese Patent Application No. 201710779585.5, dated Oct. 18, 2019.

EP Office Action for European Patent Application No. 17764712.0 dated May 7, 2020.

China National Intellectual Property Administration (CNIPA) Notification of the Second Office Action for Chinese Patent Application No. 201710779585.5, dated Sep. 18, 2020.

China National Intellectual Property Administration (CNIPA) Notification of the Third Office Action for Chinese Patent Application No. 201710779585.5, dated Apr. 23, 2021.

* cited by examiner
‡ imported from a related application

APPARATUS AND METHOD FOR RETAINING A NOISE ATTENUATION ASSEMBLY FOR USE WITH A PRESSURE REGULATOR

CROSS-REFERENCE TO RELATED APPLICATIONS

The present application is a continuation of U.S. application Ser. No. 15/254,805 filed Sep. 1, 2016, which is hereby incorporated by reference in its entirety.

FIELD OF THE DISCLOSURE

The present disclosure relates to gas regulators, and more particularly, to an apparatus and method for retaining a noise attenuation device for use with a pressure regulator.

BACKGROUND OF THE DISCLOSURE

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented into these distribution systems to ensure that the delivered gas meets the requirements of the end-user facilities.

Figure 1:
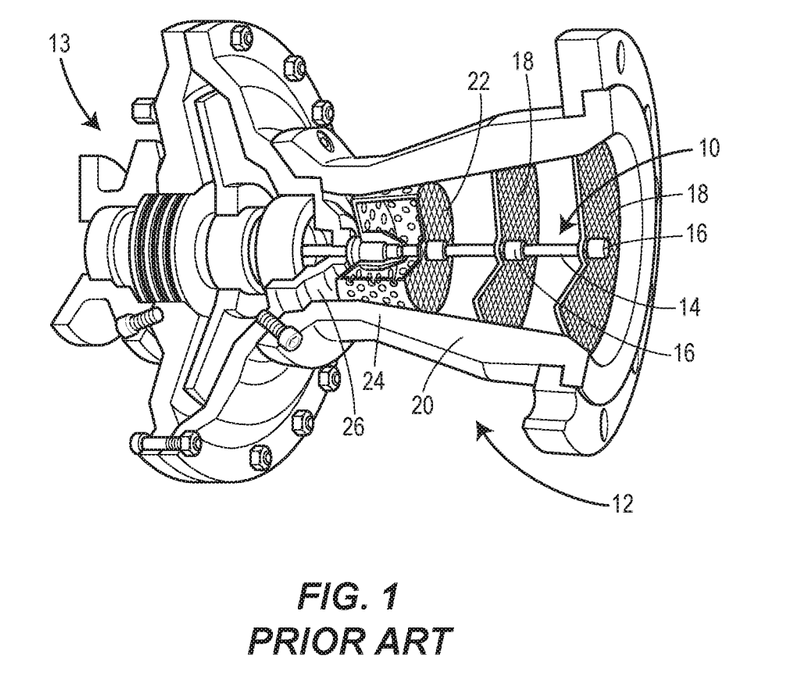
FIG. 1 depicts a conventional apparatus for retaining a noise attenuation device.
Figure 2:
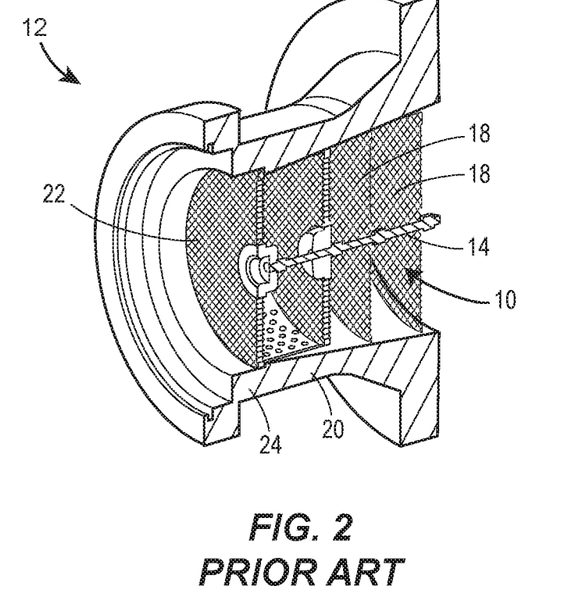
FIG. 2 depicts an isometric, sectional view of the noise attenuation device of FIG. 1.
Figure 3:
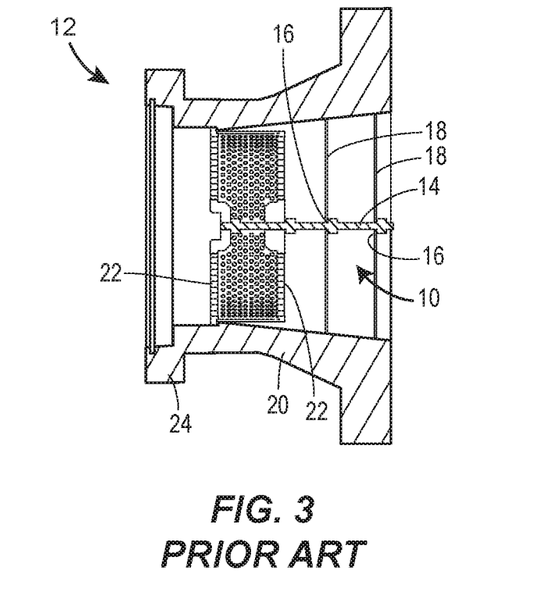
FIG. 3 depicts a side, sectional view of the noise attenuation device of FIG. 2.

Some conventional gas regulators include a noise attenuation device or noise suppression system to reduce noise associated with high pressure gases, for example, of the regulator during operation. Various systems and methods for retaining the noise attenuation device during operation of regulator are known. In one example, and as depicted in FIGS. 1-3, a conventional apparatus 10 for retaining a noise attenuation device 12 coupled to a fluid regulating device 13 (FIG. 1) includes a single rod 14 disposed within a center 16 of noise attenuation plates 18. The rod 14 supports the plates 18 within a body 20 of the noise attenuation device 12. Springs (not shown) are typically enclosed within a cage 22, such as a cylindrical cage, disposed within the body 20 near a front portion 24 of the noise attenuation device 12. The springs redirect the flow of gas or fluid flowing through the cage 22 and the plates 18 to reduce fluid pressure flowing through an outlet 26 (FIG. 1) of a regulator and reduce the noise associated with the same.

In various applications, however, in particular those in which high pressure gas is flowing through the outlet 26 of the regulator 13, the high force of the outlet pressure causes one or both of the cage 22 and plates 18 to bend. This interferes with, if not destroys, the function of the noise attenuation device 12. More specifically, and in one example, the force of the fluid pressure causes the plates 18 to detach from an inside surface of the body 20 of the noise attenuation device 12 and fold over within the body 20. As a result, the regulator noise is unable to be reduced or suppressed, and the noise attenuation device 12 fails to function properly.

SUMMARY OF THE DISCLOSURE

In accordance with a first exemplary aspect, a fluid regulating device is disclosed. The fluid regulating device includes a valve comprising an inlet, an outlet, and a valve seat disposed between the inlet and the outlet for allowing fluid to flow through the valve. An actuator is coupled to the valve and includes a control assembly having a control element and a diaphragm operably connected to the control element. The control element is disposed within the valve and adapted to be displaced relative to the valve seat for controlling the flow of a fluid between the inlet and the outlet. A noise attenuation assembly is coupled to the outlet and includes a cylindrical body and at least one plate disposed within the cylindrical body, the at least one plate having an outer edge. An apparatus for retaining the noise attenuation assembly includes a plurality of rods coupled to the at least one plate. The plurality of rods includes at least one rod having a first end disposed through the outer edge of the at least one plate.

According to another exemplary aspect of the present disclosure, an apparatus for retaining a noise attenuation assembly for use with a fluid regulating device is disclosed. The fluid regulating device includes an inlet and an outlet, and the noise attenuation assembly is coupled to the outlet and includes a front plate, a middle plate, and a rear plate disposed within the cylindrical body. Each of the front, middle and rear plates has an outer edge. The apparatus for retaining the noise attenuation assembly includes a plurality of rods. The plurality of rods have at least one rod. In addition, the at least one rod is disposed in the outer edge of one or more of the front plate, the middle plate, and the rear plate.

According to a further exemplary aspect of the present disclosure, a method for retaining a noise attenuation assembly for use with a fluid regulating device is disclosed. The method includes providing a plurality of rods. The method further includes disposing at least one rod of the plurality of rods within in an outer edge of one or more of a front plate, a middle plate or a rear plate of the noise attenuation assembly to distribute stress during operation of the fluid regulating valve toward the outer edges of the plates.

In further accordance with any one or more of the exemplary aspects, a fluid regulating device, an apparatus for retaining a noise attenuation assembly for use with a fluid regulating device, and/or a method for retaining a noise attenuation assembly for use with a fluid regulating device may optionally include any one or more of the following further preferred forms.

In some preferred forms, the noise attenuation assembly includes three plates, the three plates including a front plate, a middle plate, and a rear plate. Each of the front, middle and rear plates has an outer edge and an outer surface, and the outer surface of each plate contacts an inner surface of a cylindrical body. In addition, the at least one rod of the plurality of rods may have a front end, a middle portion, and a rear end, with the front end disposed in the outer edge of the front plate, the middle portion disposed in the outer edge of the middle plate, and the rear end disposed in the outer edge of the rear plate.

In other preferred forms, the plurality of rods may include six rods, each rod having a front end, a middle portion, and a rear end. Each front end is disposed within the outer edge of the front plate, each middle portion disposed within the outer edge of the middle plate, and each rear end disposed within the outer edge of the rear plate. So configured, the six rods are equidistantly disposed around each outer edge of the front plate, the middle plate, and the rear plate of the noise attenuation assembly, distributing stress towards the outer edges. In addition, and more generally, the plurality of rods may include six rods disposed in each of the front, middle and rear plates around the outer edges of each of the front, middle, and rear plates.

In some preferred forms, a nut may secure each rod of the plurality of rods to the outer edges of each of the front, middle, and rear plates. In addition, the apparatus for retaining the at least one plate may further include a front support member coupled to a front surface of the front plate and through which the at least one rod of the plurality of rods is disposed and secured. In another example, the front support member may be secured to the front plate by one or more nuts or bolts.

In some preferred forms, the apparatus may include a rear support member coupled to a rear surface of the rear plate and through which the at least one rod of the plurality of rods is disposed and secured. In addition, the rear support member may be secured to the rear plate by one or more nuts or bolts. Still further, in other examples, the front support member may include a ring having a rear surface in contact with the outer edge of the front plate. In still other examples, the noise attenuation assembly may further include three additional plates disposed between the front plate and the middle plate. Each of the three additional plates may include an outer edge, wherein the at least one rod is disposed in the outer edge of each of the front, middle, and rear plates and the three additional plates disposed between the front plate and the middle plate In some preferred forms, the method may further include securing the at least one rod of the plurality of rods disposed in the outer edge of one or more of the front, middle or rear plates of the noise attenuation assembly via a nut. In addition, disposing the at least one rod of the plurality of rods in the outer edge of one or more of the front, middle, or rear plates may include disposing six rods of the plurality of rods in one or more of: (1) the outer edges of each of the front, middle, and rear plates; or (2) the outer edges of each of the front, middle, and rear plates and an outer edge of each of three additional plates disposed between the front plate and the middle plate. Alternatively or additionally, disposing the at least one rod of the plurality of rods in an outer edge of one or more of the front, middle, or rear plates may include disposing a front end of each rod in the front plate, disposing a corresponding middle portion of each rod in the middle plate, and disposing a corresponding rear end of each rod in the rear plate. In addition, the method may further include coupling a front support member to a front surface of the front plate, wherein a front end of at least one rod of the plurality of rods is disposed in the front support member. Still further, the method may also include coupling a rear support member to a rear surface of the rear plate, wherein a rear end of at least one rod of the plurality of rods is disposed in the rear support member.

Additional optional aspects and features are disclosed, which may be arranged in any functionally appropriate manner, either alone or in any functionally viable combination, consistent with the teachings of the disclosure. Other aspects and advantages will become apparent upon consideration of the following detailed description.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawings arrangements which are presently discussed, it being understood, however, that the present examples are not limited to the precise arrangements and instrumentalities shown, wherein.

DETAILED DESCRIPTION OF THE DISCLOSURE

Generally, an apparatus for retaining a noise attenuation assembly for a fluid regulating device is disclosed, the noise attenuation assembly including a front plate, a middle plate, and a rear plate disposed within the cylindrical body. The apparatus includes a plurality of rods, the plurality of rods including six rods, each rod having a front end, a middle portion, and a rear end. The front end of each rod is disposed in an outer edge of the front plate, the middle portion of each rod is disposed in an outer edge of the middle plate, and the rear end of each rod is disposed in the outer edge of the rear plate. So configured, the six rods are equidistantly disposed around the outer edges of each of the front plate, the middle plate, and the rear plate of the noise attenuation assembly. As a result, stresses during operation of the fluid regulating device are distributed away from the center of the plates, for example, and toward the outer edges, strengthening and prolonging the useful life of the plates and simplifying the design of the noise attenuation assembly.

Figure 4:
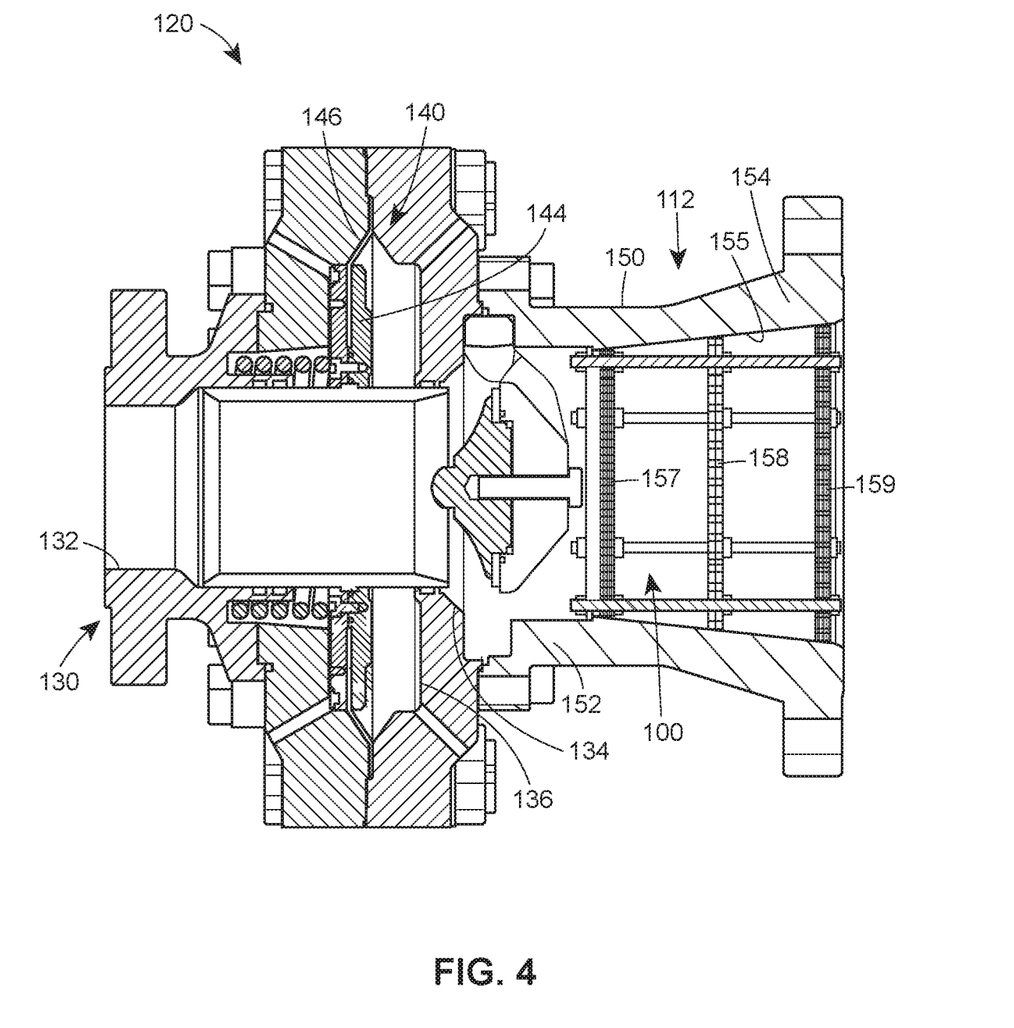
FIG. 4 depicts a side, sectional view of an apparatus for retaining a noise attenuation assembly of the present disclosure, the apparatus and the noise attenuation assembly coupled to a fluid regulating device.

Referring now to FIG. 4, an apparatus 100 for retaining a noise attenuation assembly 112 for use with a fluid regulating device 120 is depicted. The fluid regulating device 120 includes a valve 130 having an inlet 132, an outlet 134, and a valve seat 136 disposed between the inlet 132 and the outlet 134 for allowing fluid to flow through the valve 130, for example.

An actuator 140 is coupled to the valve 130 and has a control assembly 142. The control assembly 142 includes a control element 144, such as a valve plug, and a diaphragm 146 operably connected to the control element 144. As depicted in FIG. 4, the control element 144 is disposed within the valve 130 and adapted to be displaced relative to the valve seat 136 for controlling the flow of a fluid between the inlet 132 and the outlet 134.

Figure 5:
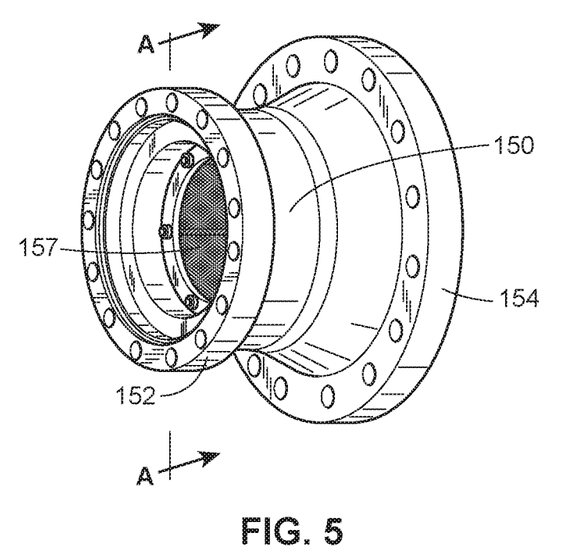
FIG. 5 depicts a perspective view of the apparatus for retaining a noise attenuation assembly of FIG. 4.

The noise attenuation assembly 112 is coupled to the valve 130, such as the outlet 134 of the valve 130, and includes a cylindrical body 150, as depicted in FIGS. 4 and 5. While the body 150 is largely cylindrical in shape, one of ordinary skill in the art will appreciate that the shape and/or configuration of the body 150 of the noise attenuation assembly 112 may take the form of various other shapes and sizes and still fall within the scope of the present disclosure. The body includes a front end 152 that is coupled to the outlet 134, in one example, a rear end 154, and an inside surface 155.

Figure 6:
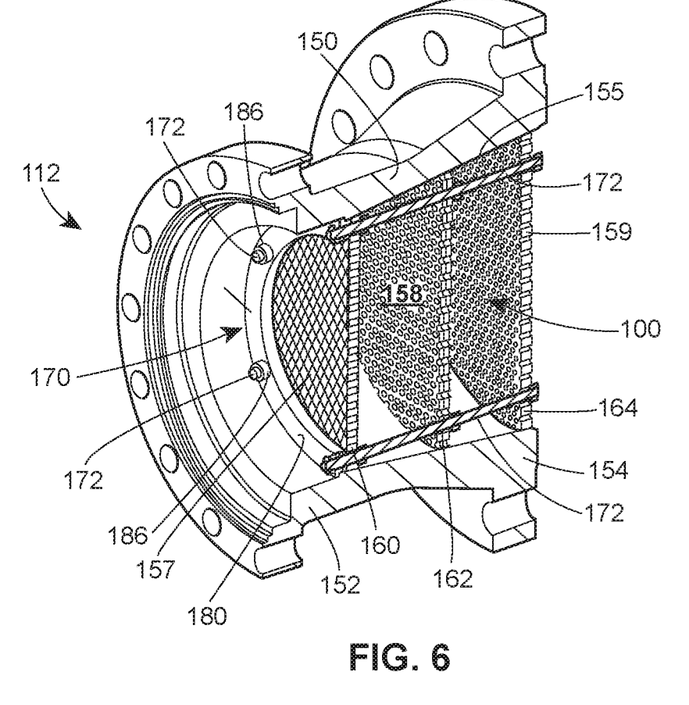
FIG. 6 depicts a cross-sectional view of the apparatus for retaining a noise attenuation assembly taken along the lines A-A of FIG. 5.
Figure 7:
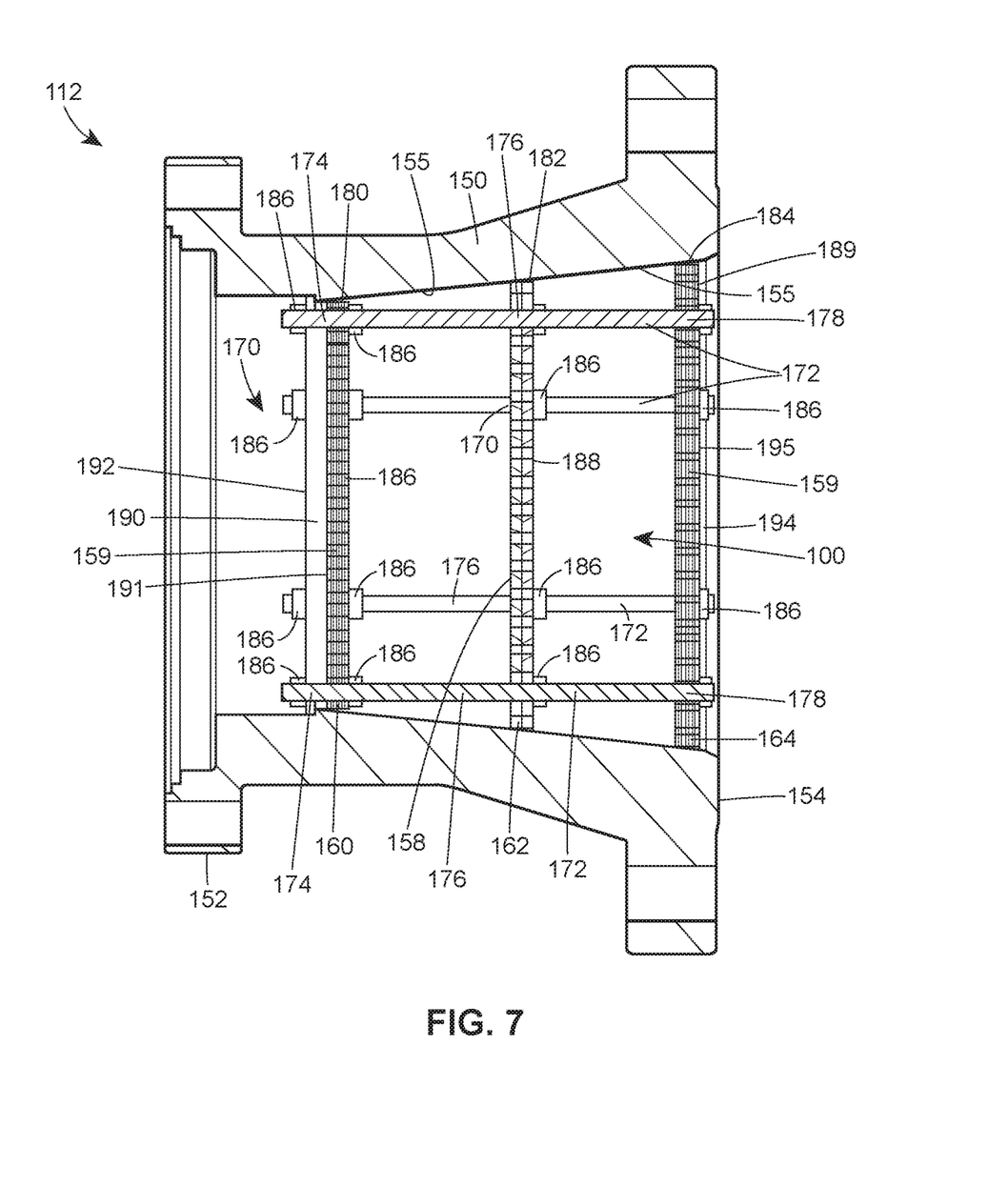
FIG. 7 depicts a side view of the apparatus of FIG. 6.

The noise attenuation assembly 112 further includes at least one plate. In one example, and as depicted in FIGS. 4 and 6, for example, three plates are included. More specifically, a front plate 157 is disposed within the cylindrical body 150 near the front end 152 of the cylindrical body. A middle plate 158 is likewise disposed within the cylindrical body 150, and a rear plate 159 is also disposed within the cylindrical body 150 near the rear end 154 of the cylindrical body 150. Each of the front plate 157, the middle plate 158, and the rear plate 159 includes an outer edge 160, 162, 164, respectively. While the three plates are depicted, more or fewer plates may be included at similar, the same or different positions than the positions of the front, middle and rear plates 157, 158, and 159 of FIG. 6, for example, and still fall within the scope of the present disclosure. For example, the middle plate 158 may be disposed at a position closer to the front plate 157 than the rear plate 159. In another example, the middle plate 158 may be disposed closer to the rear plate 159 than the front plate 157, as depicted in FIG. 7. In yet another example, the middle plate 158 may be disposed a distance from the front plate 157 equal to a distance from the rear plate 159. Said another way, the middle plate 158 may be disposed at a center point of the distance between the front and rear plates 157, 159. In still another example, the middle plate 158 may be eliminated or may be in contact with one or more of the front plate 157 or the rear plate 159. Although not depicted, a fourth and a fifth plate may be added to the noise attenuation assembly 112 and still fall within the scope of the present disclosure.

Referring now to FIGS. 6 and 7, the apparatus 100 for retaining the at least one plate of the noise attenuation assembly 112 includes a plurality of rods 170. The plurality of rods 170 is coupled to at least one plate 157, 158, 159 of the noise attenuation assembly 112. More specifically, in one example, the at least one rod 172 of the plurality of rods 170 includes a first end 174, such as front end 174, as depicted in FIG. 7, that is disposed through the outer edge 160 of the front plate 157. So configured, the apparatus 100 supports and strengthens the at least one plate, such as the front plate 157, and directs stress during operation of the fluid regulating device 120 toward the outer edges of the plates 157, 158, 159.

In one example, and as depicted in FIG. 7, for example, the front plate 157 includes an outer surface 180, the middle plate 158 includes an outer surface 182, and the rear plate 159 likewise includes an outer surface 184. Each outer surface 180, 182, and 184 of the front, middle, and rear plates 157, 158, and 159 contacts the inner surface 155 of the cylindrical body 150 of the noise attenuation assembly 120 in a press-fit manner to help secure the plates 157, 158, 159 within the body 150. As one of ordinary skill in the art will appreciate, each of the outer surfaces 180, 182, 184, for example, of the plates 157, 158, 159 may alternatively be bonded, sealed, or otherwise secured to one or more of the inside surface 155 or another part of the cylindrical body 150 and still fall within the scope of the present disclosure.

In another example, the at least one rod 172 of the plurality of rods 170 has the front end 174, a middle portion 176, and a rear end 178, the rear end 178 disposed on the opposite end of the rod 172 as the front end 174. As depicted in FIG. 7, for example, the front end 174 is disposed in the outer edge 160 of the front plate 157, the middle portion 176 is disposed in the outer edge 162 of the middle plate 158, and the rear portion 178 is disposed in the outer edge 164 of the rear plate 159.

Figure 8:
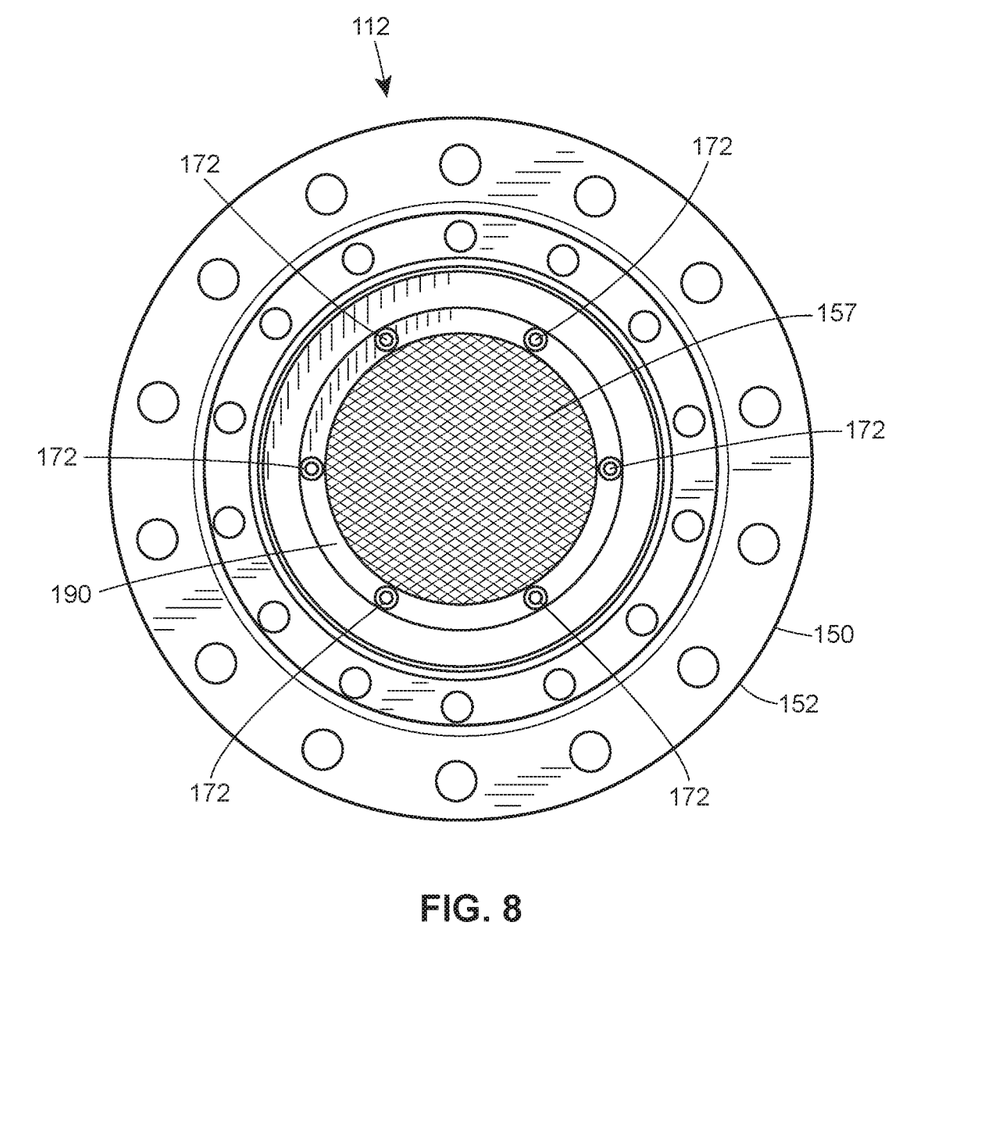
FIG. 8 depicts a front view of the apparatus for retaining a noise attenuation assembly of FIG. 5.

In one example, the plurality of rods 170 includes six rods 172 (FIG. 8), and each of the six rods 172 likewise includes the front end 174 disposed within the outer edge 160 of the front plate 157, the middle portion 176 disposed within the outer edge 162 of the middle plate 158, and the rear end 178 disposed within the outer edge 164 of the rear plate 159. So configured, the six rods 172 are equidistantly spaced from each other around each outer edge 160, 162, and 164 of the front, middle, and rear plates 157, 158, 159, respectively. Said another way, each rod 162 is spaced a distance from the adjacent or next rod 162 that is equal to each distance between each of the rods 162 disposed around the outer edges 160, 162, 164. As a result, stresses from the pressure forces during operation of the fluid regulating valve 120 are distributed towards the outer edges 160, 162, and 164.

As further depicted in FIGS. 6 and 7, a nut 186, such as one or more of a locking nut or a threaded nut, secures each rod 172 of the plurality of rods 170 to the outer edges 160, 162, and 164 of each of the front, middle, and rear plates 157, 158, 159, respectively, of the noise attenuation assembly 112. More specifically, the nut 186 secures the front end 174 of each rod 172 to the front plate 157 by contacting a rear surface 187 of the front plate 157. In a similar manner, a nut 186 also secures the middle portion 176 of each rod 172 of the plurality of rods 170 to the middle plate 158 by contacting a rear surface 188 of the middle plate 158. Likewise, nuts 186 also secure the rear portions 178 of each rod 172 to the rear plate 159, also contacting a rear surface 189 of the rear plate 159.

Further, the apparatus 100 for retaining the noise attenuation assembly 112 further includes a front support member 190 coupled to, such as in contact with, a front surface 191 of the front plate 157 and through which the at least one rod 172 is disposed and secured. More specifically, and as depicted in FIGS. 6 and 7, the front support member 190 is a ring or circular in shape and is in direct contact with the front surface 191 of the front plate 157 along the outer edge 160 of the front plate 157. Each front end 174 of the rod 172 of the plurality of rods 170 is disposed in the outer edge 160 of the front plate 157 and the front support member 190 of the apparatus 100. In addition, a nut 186, such as a threaded locking nut, for example, is also used to secure the front end 174 of the each rod 172 to the front support member 190. In one example, each nut 186 contacts a front surface 192 of the front support member 190 to further secure the front ends 174 of each rod 172 of the plurality of rods 170 to the front support member 190. Said another way, the front ends 174 of each rod 172 are secured on one side to the front support member 190 by a nut 186 and also secured on the other side to the rear surface 187 of the front plate 157 by another nut 186.

Still further, the apparatus 100 for retaining the noise attenuation assembly 112 further includes a rear support member 194 (FIG. 7) one or more of coupled to or in contact with the rear surface 189 of the rear plate 159 and through which at least one rod 172 of the plurality of rods 170 is disposed. More specifically, the rear support member 194 is a ring or circular in shape and is in direct contact with the rear surface 189 of the rear plate 159 along the outer edge 164 of the rear plate 159. Each rear end 178 of the rod 172 of the plurality of rods 170 is disposed in the outer edge 164 of the rear plate 159 and the rear support member 194 of the apparatus 100. In addition, nuts 186, such as threaded locking nuts, for example, are also used to secure the rear end 178 of the each rod 172 to the rear plate 159 and the rear support member 194. In one example, each nut 186 contacts a rear surface 195 of the rear support member 194 to further secure the rear ends 178 of each rod 172 of the plurality of rods 170 to the rear support member 194 and the rear plate 159.

Figure 9:
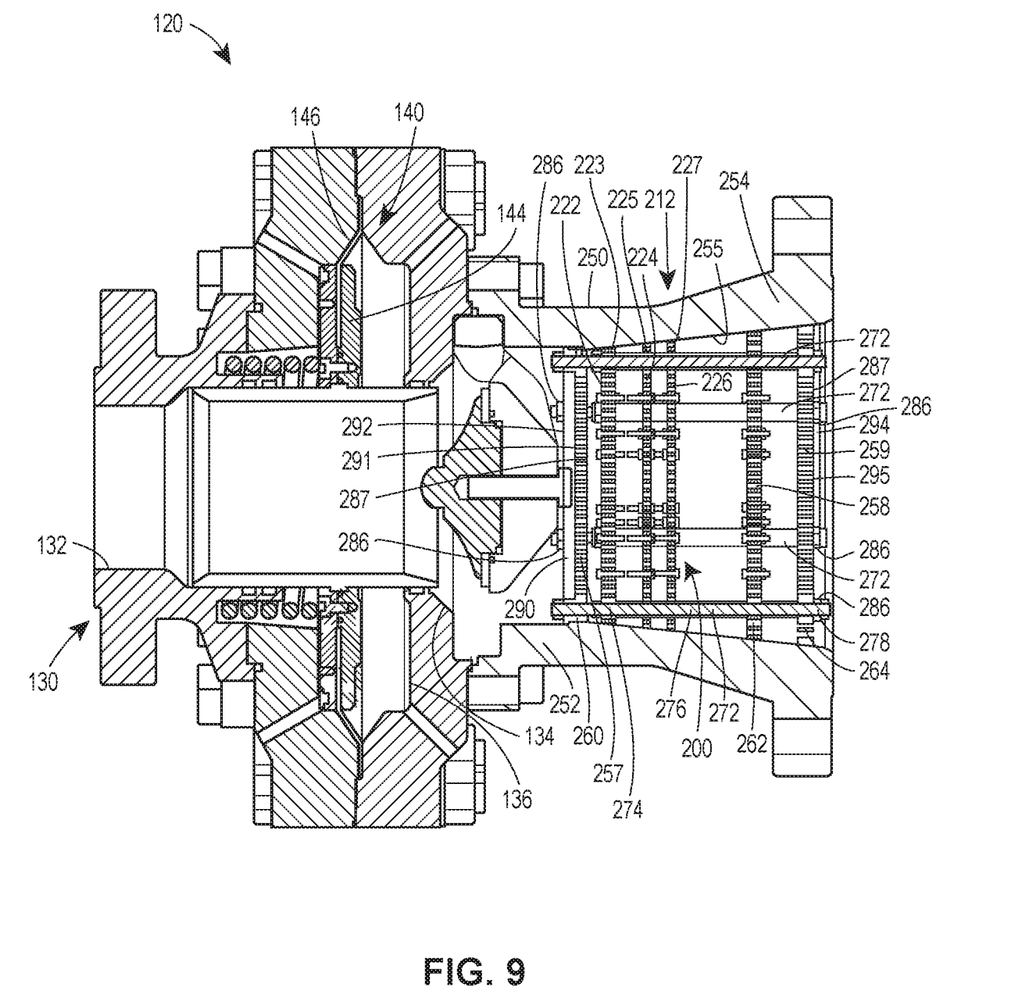
FIG. 9 depicts a side, sectional view of another noise attenuation assembly and apparatus for retaining the noise attenuation assembly.

Referring now to FIG. 9, another exemplary noise attenuation assembly 212 and an apparatus 200 for retaining the noise attenuation assembly 212 is depicted. In FIG. 9, elements of both the noise attenuation assembly 212 and the apparatus 200 for retaining the noise attenuation assembly 212 that are identical to or the same as elements of the noise attenuation assembly 112 and the apparatus 100 for retaining the noise attenuation assembly of FIGS. 1-8 have reference numbers 100 greater than the reference numbers of the noise attenuation assembly 112 and the apparatus 100.

Like the noise attenuation assembly 112, the noise attenuation assembly 212 is coupled to the valve 130, such as the outlet 134 of the valve 130, and includes a cylindrical body 250. While the body 250 is largely cylindrical in shape, one of ordinary skill in the art will appreciate that the shape and/or configuration of the body 250 of the noise attenuation assembly 212 may take the form of various other shapes and sizes and still fall within the scope of the present disclosure. The body includes a front end 252 that is coupled to the outlet 134, in one example, a rear end 254, and an inside surface 255.

The noise attenuation assembly 212 further includes at least one plate. More specifically, in this example, a front plate 257 is disposed within the cylindrical body 250 near the front end 252 of the cylindrical body. A middle plate 258 is likewise disposed within the cylindrical body 250, and a rear plate 259 is also disposed within the cylindrical body 250 near the rear end 254 of the cylindrical body 250. Each of the front plate 257, the middle plate 258, and the rear plate 259 includes an outer edge 260, 262, 264, respectively. In this example, the middle plate 258 is disposed closer to the rear plate 259 than the front plate 257. Three additional plates 222, 224, 226 are also included and disposed between the front plate 257 and the middle plate 258. More specifically, a first plate 222 of the three additional plates is disposed immediately adjacent to the front plate 257. A third plate 226 of the three additional plates is disposed next to the middle plate 258, and a second plate 224 of the three additional plates is disposed between the first plate 222 and the third plate 226.

Like the apparatus 100 for retaining the at least one plate of the noise attenuation assembly 112, the apparatus 200 for retaining the at least one plate of the noise attenuation assembly 212 includes a plurality of rods 270. The plurality of rods 270 is coupled to at least one plate 257, 258, 259, 222, 224, 226 of the noise attenuation assembly 212. More specifically, in one example, the at least one rod 272 of the plurality of rods 270 includes a first end 274, such as front end 274, as depicted in FIG. 9, that is disposed through the outer edge 260 of the front plate 257. So configured, the apparatus 200 supports and strengthens the at least one plate, such as the front plate 257, and directs stress during operation of the fluid regulating device 120 toward the outer edges of the plates 257, 258, 259, 222, 224, 226.

In another example, the at least one rod 272 of the plurality of rods 270 has the front end 274, a middle portion 276, and a rear end 278 disposed on the opposite end of the rod 272 as the front end 274. As depicted in FIG. 9, for example, the front end 274 is disposed in the outer edge 260 of the front plate 257, the middle portion 276 is disposed in the outer edge 262 of the middle plate 258, and the rear portion 278 is disposed in the outer edge 264 of the rear plate 259. In addition, the at least one rod 272 of the plurality of rods is also disposed in an outer edge 223 of the first plate 222 of the three additional plates of the noise attenuation assembly 212, an outer edge 225 of the second plate 224 of the three additional plates, and an outer edge 227 of the third plate 226 of the three additional plates.

In one example, the plurality of rods 270 includes six rods 272 (not shown), and each of the six rods 272 likewise includes the front end 274 disposed within the outer edge 260 of the front plate 257, the middle portion 276 disposed within the outer edge 262 of the middle plate 258, and the rear end 278 disposed within the outer edge 264 of the rear plate 259. In addition, each of the six rods 272 also includes a portion disposed in the outer edge 223 of the first plate 222, the outer edge 225 of the second plate 224, and the outer edge 227 of the third plate 226. So configured, the six rods 272 are equidistantly spaced from each other around each outer edge 260, 262, 264, 223, 225, 227 of the plates 257, 258, 59, 222, 224, 226, respectively. Said another way, each rod 262 is spaced a distance from the adjacent or next rod 262 that is equal to each distance between each of the rods 262 disposed around the outer edges 260, 262, 264, 223, 225, 227. As a result, stresses from the pressure forces during operation of the fluid regulating valve 120 are distributed towards one or more of the outer edges 260, 262, 264, 223, 225, and 227.

As further depicted in FIG. 9, a nut 286, such as one or more of a locking nut or a threaded nut, secures each rod 272 of the plurality of rods 270 to the outer edges 260, 262, and 264, 223, 225, 227 of each of the plates 257, 258, 259, 222, 224, 226, respectively, of the noise attenuation assembly 212.

Further, the apparatus 200 for retaining the noise attenuation assembly 212 further includes a front support member 290 coupled to, such as in contact with, a front surface 291 of the front plate 257 and through which the at least one rod 272 is disposed and secured. The front support member 290 may be a ring or circular in shape and is in direct contact with the front surface 291 of the front plate 257 along the outer edge 260 of the front plate 257. Each front end 274 of the rod 272 of the plurality of rods 270 is disposed in the outer edge 260 of the front plate 257 and the front support member 290 of the apparatus 200. In addition, a nut 286, such as a threaded locking nut, for example, is also used to secure the front end 274 of the each rod 272 to the front support member 290. In one example, each nut 286 contacts a front surface 292 of the front support member 290 to further secure the front ends 274 of each rod 272 of the plurality of rods 270 to the front support member 290.

Still further, the apparatus 200 for retaining the noise attenuation assembly 212 further includes a rear support member 294 one or more of coupled to or in contact with the rear surface 289 of the rear plate 259 and through which at least one rod 272 of the plurality of rods 270 is disposed. More specifically, the rear support member 294 may be a ring or circular in shape and is in direct contact with the rear surface 289 of the rear plate 259 along the outer edge 264 of the rear plate 259. Each rear end 278 of the rod 272 of the plurality of rods 270 is disposed in the outer edge 264 of the rear plate 259 and the rear support member 294 of the apparatus 200. In addition, nuts 286, such as threaded locking nuts, for example, are also used to secure the rear end 278 of the each rod 272 to the rear plate 259 and the rear support member 294. In one example, each nut 286 contacts a rear surface 295 of the rear support member 294 to further secure the rear ends 278 of each rod 272 of the plurality of rods 270 to the rear support member 294 and the rear plate 259.

As one of ordinary skill in the art will appreciate, the nuts 186, 286 referred to herein may alternatively take the form of various other fasteners, such as threaded wing nuts, clips, snaps, bolts, bonding materials, and/or any other fastener capable of achieving the same function as the nuts 186, 286 and still fall within the scope of the present disclosure. Further, while the rods 172, 272 of the plurality of rods 170, 270 are threaded, one of ordinary skill in the art will further understand that the rods 172, 272 may take the form of various other shapes and configurations and still fall within the scope of the present disclosure. For example, the rods 172, 272 may include only a partially threaded portion or no threaded portions, may include one or more flat surfaces, and may not be circular or cylindrical in shape.

Still further, while the front and rear support members 190, 290 and 194, 294, respectively, are depicted and described as one or more of rings or circular portions, one of ordinary skill in the art will further appreciate that the front and rear support members 190, 290 and 194, 294 may alternatively be various other shapes and sizes and still fall within the scope of the present disclosure. More specifically, one or more of the front and rear support members 190, 194 may be a solid circular plate without an aperture disposed in the center, a rectangular or square-like shape, a triangular shape or another configuration and still be capable of contacting the plates, as needed, and receiving the ends of the rods 172, 272, for example.

In addition, while not depicted in any of the figures, one of ordinary skill in the art will still further understand that fewer rods 172, 272 of the plurality of rods 170, 270 may be used and still fall within the scope of the present disclosure. In one example, the plurality of rods 170, 270 may include only two rods, equidistantly disposed from each other along the outer edges 160, 162, 164, of the plates 157, 158, 159. In another example, the plurality of rods 170, 270 may include three rods 172, 272, four rods 172, 272, or five rods 172,272, each of which are again equidistantly disposed from each other again along the outer edges 160, 162, 164 of the plates 157, 158, 159 or the outer edges 260, 262, 264, 223, 225, 227 of the plates 257, 258, 259, 222, 224, 226. In yet another example, the more than one rod 172, 272 of the plurality of rods 170, 270 in any number configuration may include only some rods 172, 272 that are equidistantly disposed from each other and other rods 172, 272 that are not equidistantly disposed from each other.

In view of the foregoing, one of ordinary skill in the art will further appreciate the following example method for retaining the plates 157, 158, 159, 257, 258, 259, 222, 224, 226 of the noise attenuation assembly 112, 212 for use with the fluid regulating device 120. More specifically, the method for retaining the noise attenuation assembly 112, 212 for use with the fluid regulating device 120 includes providing the plurality of rods 170, 270. The method further includes disposing at least one rod 172, 272 of the plurality of rods within the outer edges 160, 162, 164, 260, 262, 264, 223, 225, 227 of one or more of the front plate 157, 257, the middle plate 158, 258 or the rear plate 159, 259 of the noise attenuation assembly 112, 212 to distribute stress during operation of the fluid regulating device 120, 220 toward the outer edges 160, 162, 164, 260, 262, 264, 223, 225, 227 of the plates 157, 158, 159, 257, 258, 259, 222, 224, 226.

In addition, and in one example, the method may further comprise securing the at least one rod 172, 272 of the plurality of rods 170, 270 disposed in the outer edge 160, 162, 164, 260, 262, 264 of the front, middle or rear plates 157, 257,158, 258, 159, 259, respectively, via one or more nuts 186, 286. In another example, the method may comprise disposing six rods 172, 272 of the plurality of rods 170, 270 in the outer edges 160, 162, 164, 260, 262, 264 of each of the front, middle or rear plates 157, 158, 159, 257, 258, 259. In yet another example, the method may include disposing the front end 174, 274 of each rod 172, 272 of the plurality of rods 170, 270 in the front plate 157, 257 disposing a corresponding middle portion 176, 276 of each rod 172, 272 in the middle plate 158, 258 and disposing a corresponding rear end portion 178, 278 of each rod 172, 272 in the rear plate 159, 259.

Further, the method may further comprise coupling the front support member 190, 290 to the front surface 191, 291 of the front plate 157, 257 wherein the front end 174, 274 of at least one rod of the plurality of rods 170, 270 is disposed in the front support member 190, 290. In addition, the method may further comprise coupling the rear support member 194, 294 to the rear surface 189, 289 of the rear plate 159, 259 wherein the rear end 178, 278 of the at least one rod 172, 272 of the plurality of rods 170, 270 is disposed in the rear support member 194, 294.

Overall, one of ordinary skill in the art will appreciate the various advantages of the new apparatus 100, 200 and method of retaining the noise attenuation assembly 112, 212. For example, the apparatus 100, 200 supports and strengthens the at least one plate, such as the front plate 157, 257 and directs stress during operation of the fluid regulating device 120 toward the outer edges of the plates 157, 158, 159, 257, 258, 259, 222, 224, 226 and away from the center of the plates. In addition, the front and rear support members 190, 290 and 194, 294, respectively, also further strengthen the plates 157, 257, 158, 258, 159, 259, preventing folding of the plates 157, 257, 158, 258, 159, 259 during operation of the fluid regulating device 120, while still reducing and suppressing noise from the fluid regulating device 120. Still further, by providing more than one rod disposed on the outer edges of the plates 157, 158, 159, 257, 258, 259, 222, 224, 226 and more than two plates, for example, along with the front and rear support members 190, 290, 194, 294, the cage 22 of the conventional apparatus 10 and springs (not shown) typically disposed within the cage 22 to suppress the sound of the fluid flowing through outlet, for example, are not needed. As a result, the design of the noise attenuation assembly 112, 212 and the new apparatus 100, 200 is simplified and manufacturing costs are reduced, while providing better performance and a longer life.

The fluid regulating device 120 described herein is merely one example of a fluid control device incorporating the principles of the present disclosure. Other fluid control devices including other regulators and control valves may also benefit from the structures and/or advantages of the present disclosure. More generally, although certain example apparatus and methods have been described herein, the scope of coverage of this patent is not limited thereto. On the contrary, this patent covers all methods, apparatus and articles of manufacture fairly falling within the scope of the appended claims either literally or under the doctrine of equivalents.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one example" or "an example" means that a particular element, feature, structure, or characteristic described in connection with the embodiment is included in at least one embodiment. The appearances of the phrase "in one example" in various places in the specification are not necessarily all referring to the same example.

Some examples may be described using the expression "coupled" and "connected" along with their derivatives. For example, some examples may be described using the term "coupled" to indicate that two or more elements are in direct physical or electrical contact. The term "coupled," however, may also mean that two or more elements are not in direct contact with each other, but yet still cooperate or interact with each other. The examples are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

While various embodiments have been described above, this disclosure is not intended to be limited thereto. Variations can be made to the disclosed examples that are still within the scope of the appended claims.

What is claimed is:

1. A noise attenuation assembly that is configured to be positioned downstream of a fluid regulating device, the noise attenuation assembly comprising:
   a body that defines a front end, a rear end, and an interior;
   a ring-shaped support member engaging an inner surface of the body;
   a plurality of plates that are positioned within the interior of the body, wherein each plate comprises a plurality of holes and is spaced apart from each other plate; and
   a plurality of rods, wherein each rod extends through each plate of the plurality of plates, is secured to an outer edge of each plate and the ring-shaped support member by a fastener, and is displaced from a center of the plate, and wherein the plurality of rods and the fasteners that are attached to each rod mechanically link the plurality of plates.

2. The noise attenuation assembly of claim 1, wherein each of the plurality of plates is circular.

3. The noise attenuation assembly of claim 2, wherein centers of the plurality of plates are aligned.

4. The noise attenuation assembly of claim 3, wherein each of the plurality of rods is positioned at a common radius from the centers.

5. The noise attenuation assembly of claim 2, wherein each of the plurality of plates has a larger diameter than any plate that is positioned nearer to the front end.

6. The noise attenuation assembly of claim 1, wherein the interior of the body comprises an inner surface that is configured to prevent movement of the mechanically linked plurality of plates toward the rear end of the body.

7. The noise attenuation assembly of claim 1, wherein the support member engages the inner surface of the body.

8. A noise attenuation assembly, comprising:
   a body that defines a front end, a rear end, and an interior, wherein the rear end has a larger flow area than the front end;
   a ring-shaped support member that engages an inner surface of the body and a lip within the interior of the body;
   a plurality of plates disposed within the interior of the body, wherein each plate of the plurality of plates is spaced apart from each other plate and includes a plurality of holes;
   a plurality of rods, each rod extending through each plate of the plurality of plates and the ring-shaped support member, each rod is secured to an outer edge of each plate and the ring-shaped support member by a fastener, each rod and is displaced from a center of the plate; and
   a plurality of fasteners, wherein at least one fastener is coupled to at least one of the plurality of rods, and wherein the plurality of rods and the plurality of fasteners mechanically link the plurality of plates and the ring-shaped support member.

9. The noise attenuation assembly of claim 8, wherein a portion of the ring-shaped support member has a diameter that is larger than a diameter of the lip.

10. The noise attenuation assembly of claim 9, wherein the engagement between the ring-shaped support member and the lip prevents the plurality of plates from being moveable toward the rear end of the body.

11. The noise attenuation assembly of claim 8, wherein each of the plurality of plates is circular.

12. The noise attenuation assembly of claim 8, wherein one or more of the centers of the plurality of plates are aligned, and each of the plurality of rods is positioned at a common radius from the centers.

13. The noise attenuation assembly of claim 8, wherein the interior of the body comprises an inner surface that is configured to prevent movement of the mechanically linked plurality of plates toward the rear end of the body, and the ring-shaped support member engages the inner surface.

14. A fluid regulating device, comprising:
   a valve having an inlet and an outlet;
   a noise attenuation assembly coupled to the outlet, the noise attenuation assembly comprising:
      a body that defines a front end, a rear end, and an interior, the front end coupled to the outlet of the valve;

a ring-shaped support member engaging an inner surface of the body;
a plurality of plates positioned within the interior of the body, wherein each plate comprises a plurality of holes and is spaced apart from each other plate; and
a plurality of rods, wherein each rod extends through each plate of the plurality of plates, is secured to an outer edge of each plate and the ring-shaped support member by a fastener, and is displaced from a center of the plate and wherein the plurality of rods and the fasteners that are attached to each rod mechanically link the plurality of plates.

15. The fluid regulating device of claim 14, where the valve further comprises a valve seat disposed between the inlet and the outlet, and further comprising an actuator coupled to the valve and having a control assembly, the control assembly including a control element adapted to be displaced relative to the valve seat for controlling a fluid between the inlet and the outlet of the valve.

16. The fluid regulating device of claim 14, wherein one or more of each of the plurality of plates is circular, centers of the plurality of plates are aligned, and each of the plurality of rods is positioned at a common radius from the centers.

17. The fluid regulating device of claim 14, wherein each of the plurality of rods extends through the ring-shaped support member.

* * * * *

UNITED STATES PATENT AND TRADEMARK OFFICE
CERTIFICATE OF CORRECTION

PATENT NO. : 11,261,999 B2
APPLICATION NO. : 16/668468
DATED : March 1, 2022
INVENTOR(S) : Joshua Logan Tecson et al.

Page 1 of 1

It is certified that error appears in the above-identified patent and that said Letters Patent is hereby corrected as shown below:

In the Specification

At Column 1, Line 10, "2016," should be -- 2016, now abandoned, --.

At Column 2, Line 33, "within in" should be -- within --.

At Column 3, Line 24, "plate" should be -- plate. --.

At Column 4, Line 7, "isometic," should be -- isometric, --.

At Column 5, Line 26, "disposed a" should be -- disposed at a --.

At Column 5, Line 55, "noise attenuation assembly 120" should be -- noise attenuation assembly 112 --.

At Column 6, Line 14, "rod 162" should be -- rod 172 --.

At Column 6, Line 15, "rod 162" should be -- rod 172 --.

At Column 6, Line 16, "rods 162" should be -- rods 172 --.

At Column 8, Line 22, "rod 262" should be -- rod 272 --.

At Column 8, Lines 22-23, "rod 262" should be -- rod 272 --.

At Column 8, Lines 23-24, "rods 262" should be -- rods 272 --.

At Column 11, Line 22, "limited in" should be -- limited to --.

Signed and Sealed this
Seventh Day of February, 2023

Katherine Kelly Vidal
*Director of the United States Patent and Trademark Office*